Oct. 2, 1945.  H. R. LONGFELLOW  2,386,127
TESTING APPARATUS
Filed Sept. 11, 1942
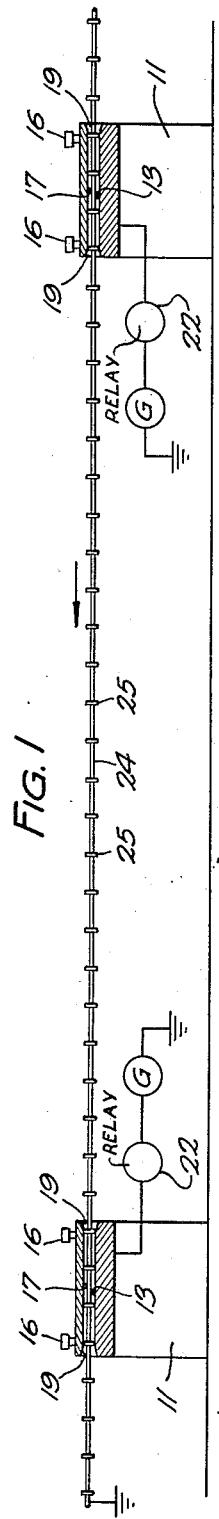
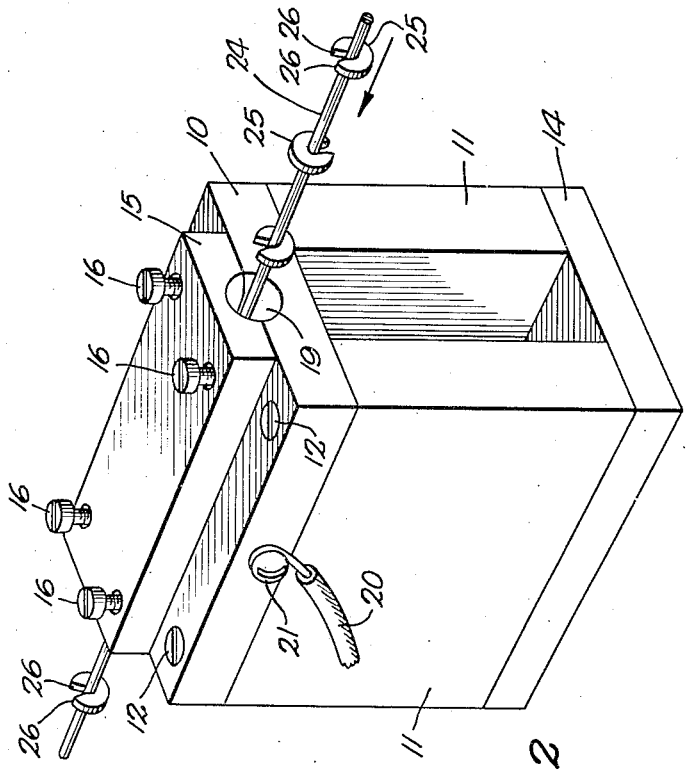
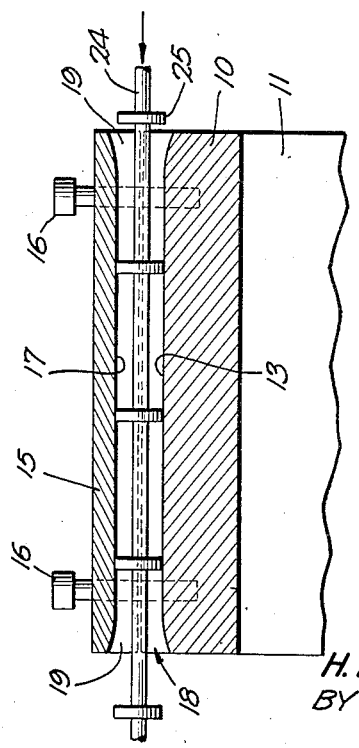
INVENTOR
H. R. LONGFELLOW
BY
ATTORNEY Patented Oct. 2, 1945

2,386,127

UNITED STATES PATENT OFFICE 2,386,127

TESTING APPARATUS

Harold R. Longfellow, Baltimore, Md., assignor to Western Electric Company, Incorporated, New York, N. Y., a corporation of New York Application September 11, 1942, Serial No. 457,949

4 Claims. (Cl. 175—183)

This invention relates to testing apparatus and, more particularly, to apparatus for testing coaxial cables.

In the manufacture of coaxial cables, a plurality of disc-shaped insulators are spacedly positioned upon a central conductor in order to insulate and space an outer tubular conductor therefrom. V-shaped slots are cut in the insulators with the apex of each slot located at the center of the insulator and so rounded out as to permit it to partially surround the central conductor. It was discovered that there was a tendency for an almost microscopic film of dirt or metal from the conductor to be deposited upon the edges of the V-shaped slots in the insulators, when the insulators were placed upon a dirty portion of the central conductor by forcing the central conductor up into the slot in each insulator.

Although the film could not be readily distinguished with the naked eye, it provided a path of reduced dielectric strength between the central and outer conductors of the coaxial cable and shorted the cable, causing it to break down. Wire splinters, bits of tin foil in the insulators, and other metal fragments in the insulators also caused the coaxial cable to break down.

Objects of the invention are to provide new and improved testing apparatus and, more particularly, to provide simple and effective apparatus for testing coaxial cables.

One embodiment of the invention comprises a plurality of electrodes which are movably mounted relative to one another, means for imparting an electrical potential to the electrodes, means for advancing a strand having a plurality of spaced insulators positioned thereon between the electrodes, and means for indicating the passage of a defective insulator between the electrodes.

Other features and advantages of the invention will become apparent from the following detailed description of one embodiment thereof when read in conjunction with the accompanying drawing, in which Fig. 1 is a fragmentary view of an apparatus for manufacturing a coaxial cable showing in longitudinal section a pair of testing devices embodying the invention.

Fig. 2 is an enlarged perspective view of one of the testing devices shown in Fig. 1, and Fig. 3 is a fragmentary, longitudinal, sectional view of the testing device shown in Fig. 2.

In the particular embodiment of the invention disclosed in the accompanying drawing, a rectangular electrode 10 is fastened to supports 11—11 by means of screws 12—12. The supports 11—11 are made of an electrical insulating material and insulate the electrode 10 from a base 14. A second smaller rectangular electrode 15 rests upon the electrode 10 and is positioned thereon by means of a plurality of pins 16—16. The pins 16—16 are based in the electrode 10 and have smooth shanks to permit the electrode 15 to move freely vertically, thus making the electrode 15 a floating electrode. The electrodes 10 and 15 have formed therein depressions 13 and 17, respectively, which cooperate to provide a passage 18 between the electrodes. The depressions 13 and 17 are similar in shape, and each depression is provided with outwardly flaring ends. The depressions are aligned so that the flared ends of the respective depressions provide the passage 18 with conical end portions 19—19.

An electric current, either alternating or direct, is supplied from a source of high voltage to the electrodes 10 and 15 by an insulated wire 20 connected to the electrode 10 by a screw 21. A relay 22 is connected in line between the high voltage source and the electrodes 10 and 15, and is operable when a voltage breakdown occurs.

In the operation of the device, a central conductor 24 of a coaxial cable to which a plurality of disc-shaped insulators 25—25 have been applied is advanced through the passage 18 between the electrodes 10 and 15. The conical end portions 19—19 of the passage 18 prevent the insulators 25—25 from catching on the outside of the electrode 10 before entering the passage 18. The height of the passage 18 is slightly less than the diameter of the average insulator 25—25, and the curvature of the depressions formed in the electrodes is slightly greater than the curvature of the average insulator 25 to prevent pinching when an insulator slightly larger than average passes through the passage 18. Consequently, the average insulator contacts the slightly elliptical passage 18 at the top and bottom only. As each insulator 25 is guided into the passage 18 through the leading conical end portion 19, it presses, at its top and bottom, against the depressions 13 and 17 formed in the electrodes 10 and 15, respectively, thus forcing the electrode 15 slightly away from the electrode 10.

Normally no current flows from the electrodes 10 and 15 to the central conductor 24, since the insulators 25—25 effectually insulate the central conductor from the electrodes as it passes through the passage 18. When, however, the insulators 25—25 have been applied to a dirty wire so that a film of dirt or metal has formed along edges 26—26 of a V-shaped slot formed in each of the insulators, or an insulator is defective in some other way, an electric breakdown occurs and a spark jumps from either the electrode 10 or 15 to the central conductor 24. The electrical breakdown causes an instantaneous current to flow through the electrodes 10 and 15 and operates the relay 22, which acts to arrest further advancement of the coaxial cable through the apparatus. The defective insulator or insulators may then be easily detected, removed and replaced.

Many changes may be made in the particular construction of the testing apparatus herein described without departing from the spirit and scope of the invention as defined in the annexed claims. Such variations and modifications will be apparent to those skilled in the art.

What is claimed is:

1. In an apparatus for testing insulating discs positioned on a central conductor as the conductor and the discs mounted thereon are advanced through the apparatus, a stationary electrode having a semielliptical groove extending along the upper surface thereof, a movable electrode having a semielliptical groove complementary to the first-mentioned groove and positioned along the bottom surface thereof, and a plurality of pins extending from the upper surface of the stationary electrode for mounting the movable electrode slidably thereon with the second-mentioned groove directly over the first-mentioned groove to form a passage through which a conductor having insulating discs thereon may be drawn, the movable electrode being light in weight and urged only by gravity toward the stationary electrode, whereby the movable electrode may be raised easily from the stationary electrode to enlarge the passage formed by the grooves.

2. In an apparatus for testing a conductor having spaced insulators thereon, a stationary electrode having an axially straight depression formed therein, a plurality of pins secured to the stationary electrode on opposite sides of the depression, and a second electrode slidably mounted on the pins for movement with respect to the first-mentioned electrode and biased thereto with such force to engage the insulators and not disturb their spacing, said second electrode having formed therein a depression which co-acts with the depression in the stationary electrode to form an axially straight passage through which an insulated conductor to be tested may be advanced.

3. In an apparatus for testing a conductor having spaced insulators thereon, a stationary electrode having an axially straight depression extending along the upper face thereof, a second electrode having an axially straight depression extending along the lower face thereof and resting on the stationary electrode with the depressions co-acting to form an axially straight passage, and means for mounting the second electrode for movement away from the stationary electrode to give contact between the insulators and the electrodes and not disturb the positions of the insulators on the conductor as it advances through the passage between the electrodes.

4. In an apparatus for testing a conductor having spaced insulators thereon, an oblong bottom electrode having a semielliptical, axially straight groove formed along the longitudinal axis of the upper face thereof, an oblong upper electrode having a semielliptical, axially straight groove formed along the longitudinal axis of the bottom thereof, and a plurality of pins secured to and extending above the bottom electrode to slidably mount the upper electrode upon the bottom electrode, the grooves in the electrodes being aligned and forming an expansible, elliptical passage through which a conductor having spaced insulators thereon may be passed, whereby the electrodes contact the insulators on the conductor without disturbing the positions of the insulators thereon as it advances through the passage between the electrodes.

HAROLD R. LONGFELLOW.